US011158192B2

(12) United States Patent
Unverdorben et al.

(10) Patent No.: US 11,158,192 B2
(45) Date of Patent: Oct. 26, 2021

(54) METHOD AND SYSTEM FOR DETECTING PARKING SPACES WHICH ARE SUITABLE FOR A VEHICLE

(71) Applicant: VEONEER SWEDEN AB, Vargarda (SE)

(72) Inventors: Christopher Unverdorben, Freising (DE); Andreas Schmid, Dachau (DE); Christian Pfaffenzeller, Olching (DE); Uwe Siart, Munich (DE)

(73) Assignee: VEONEER SWEDEN AB, Vargarda (SE)

(*) Notice: Subject to any disclaimer, the term of this patent is extended or adjusted under 35 U.S.C. 154(b) by 0 days.

(21) Appl. No.: 16/975,853

(22) PCT Filed: Feb. 11, 2019

(86) PCT No.: PCT/IB2019/051073
§ 371 (c)(1),
(2) Date: Sep. 28, 2020

(87) PCT Pub. No.: WO2019/162794
PCT Pub. Date: Aug. 29, 2019

(65) Prior Publication Data
US 2021/0174682 A1    Jun. 10, 2021

(30) Foreign Application Priority Data
Feb. 26, 2018   (DE) .................... 10 2018 104 243.4

(51) Int. Cl.
G08G 1/14       (2006.01)
G01S 7/41       (2006.01)
G01S 13/931     (2020.01)

(52) U.S. Cl.
CPC ............. *G08G 1/143* (2013.01); *G01S 7/41* (2013.01); *G01S 13/931* (2013.01); *G01S 2013/9314* (2013.01)

(58) Field of Classification Search
CPC ........ G01S 13/931; G01S 15/931; G01S 7/41; G01S 2013/9314; G01S 2013/9375;
(Continued)

(56) References Cited

U.S. PATENT DOCUMENTS 6,239,738 B1    5/2001  Wanielik et al.
6,265,968 B1 *  7/2001  Betzitza ................ G01S 17/931
                                                        340/436

(Continued)

FOREIGN PATENT DOCUMENTS

DE    19600059 A1    7/1997
DE    10220837 A1    11/2003
(Continued)

OTHER PUBLICATIONS

International Search Report of PCT/IB2019/051073, dated May 24, 2019.

Primary Examiner — Brian E Miller
(74) Attorney, Agent, or Firm — Dickinson Wright PLLC

(57) ABSTRACT

A method and a system (100) for detecting parking spaces (32) suitable for a vehicle (1). In order to determine a parking space (32), radar signals (11) are directed to a plurality of vehicles ($30_1$, $30_2$, ... $30_M$) parked in a parking area (13) and also to surrounding elements (34). The radar signals (12) reflected by the parked vehicles ($30_1$, $30_2$, ... $30_M$) and also the surrounding elements (34) are processed in a computing unit (15). A gap (29) in a calculated periodicity (51) of a projection profile (24) is determined with an
(Continued)

autoregressive prediction filter (53). A prediction error function (26) has the highest value (55) at the location of a parking space (32).

11 Claims, 6 Drawing Sheets

(58) Field of Classification Search
CPC ......... G01S 2015/932; G01S 2015/933; G01S 2015/935; G01S 2015/936; G08G 1/143; B60W 30/06; B60T 2201/10
See application file for complete search history.

(56) References Cited

U.S. PATENT DOCUMENTS

| | | | |
|---|---|---|---|
| 6,943,726 B2 | 9/2005 | Schneider | |
| 9,000,903 B2* | 4/2015 | Bowers | G06Q 40/08 340/436 |
| 9,884,620 B2* | 2/2018 | Hess | G08G 1/148 |
| 10,152,639 B2* | 12/2018 | Pathangay | G06T 7/74 |
| 10,276,047 B2* | 4/2019 | Seo | B60W 40/10 |
| 10,303,183 B2* | 5/2019 | Harvey | G05D 1/0027 |
| 10,423,162 B2* | 9/2019 | Yalla | G08G 1/149 |
| 10,604,185 B2* | 3/2020 | Benmimoun | G05D 1/0212 |
| 10,720,058 B2* | 7/2020 | Ding | G06K 9/00812 |
| 10,915,767 B2* | 2/2021 | Ding | G06K 9/00812 |
| 10,949,686 B2* | 3/2021 | Okada | G06K 9/4642 |
| 2002/0003488 A1* | 1/2002 | Levin | G01S 7/023 342/70 |
| 2003/0102997 A1* | 6/2003 | Levin | G01S 7/006 342/57 |
| 2003/0160717 A1* | 8/2003 | Mattes | G01S 13/931 342/70 |
| 2009/0128364 A1 | 5/2009 | Lee | |
| 2011/0116717 A1 | 5/2011 | Lee | |
| 2012/0062393 A1* | 3/2012 | Desiderio | G08G 1/14 340/932.2 |
| 2016/0148514 A1* | 5/2016 | Iwami | B60W 30/06 340/932.2 |
| 2017/0294121 A1* | 10/2017 | Jain | G08G 1/146 |
| 2018/0025640 A1* | 1/2018 | Micks | G06K 9/00812 340/932.2 |
| 2018/0095474 A1* | 4/2018 | Batur | G01S 19/48 |
| 2019/0170870 A1* | 6/2019 | Marsch | G01S 13/343 |
| 2019/0355255 A1* | 11/2019 | Bakucz | G01S 13/04 |
| 2020/0175868 A1* | 6/2020 | Reisbick | G08G 1/142 |
| 2020/0223429 A1* | 7/2020 | Marsousi | G06K 9/00812 |

FOREIGN PATENT DOCUMENTS

| | | |
|---|---|---|
| DE | 102005032095 A1 | 1/2007 |
| DE | 102008004633 A1 | 7/2009 |
| DE | 102011113719 A1 | 8/2012 |
| EP | 2052208 B1 | 10/2013 |
| EP | 3040909 A1 | 7/2016 |
| WO | 2008009965 A1 | 1/2008 |

\* cited by examiner

METHOD AND SYSTEM FOR DETECTING PARKING SPACES WHICH ARE SUITABLE FOR A VEHICLE

CROSS-REFERENCE TO RELATED APPLICATIONS

This application is a 35 U.S.C. § 371 national phase of PCT International Application No. PCT/IB2019/051073, filed Feb. 11, 2019, which claims the benefit of priority under 35 U.S.C. § 119 to German Patent Application No. 10 2018 104 243.4, filed Feb. 26, 2018, the contents of which are incorporated herein by reference in their entirety.

FIELD OF THE INVENTION

The invention relates to a method for detecting parking spaces suitable for an ego vehicle.

The invention further relates to a system for detecting parking spaces suitable for an ego vehicle. The system comprises at least one radar device which is integrated in the vehicle and comprises a transmitter with a signal generator and a receiver assembly and a receiver. A computing unit is communicatively connected to the radar device. The computing unit is implemented in a central control unit of the vehicle integrated in the vehicle.

BACKGROUND

European patent EP 2 052 208 B1 discloses the determination of the location of a vehicle on a map. The map comprises a plurality of points associated with features. A scene image is taken from the vehicle, and points in the image corresponding to the features in the scene are identified. Points in the captured image are compared with the map in order to determine the position of the vehicle. Moreover, at least one further scene image must be taken, wherein points which are associated with features in the at least one further image are identified and the points identified in the image are compared with the or each further image. This also includes measuring the movement of the vehicle, as well as the prediction made therefrom as to where the points will be in the at least one further image. A predictive determination of an available parking space is not possible.

International patent application WO 2008/009965 A1 discloses a method for generating a map corresponding to the locations of feature points. In this case, the vehicle passes the scene and at least one image is taken. On the basis of the captured image, it is also possible, for example, to determine whether a parking spot is available. This method has the disadvantage that it is not predictive and the available parking spot can only be determined when the vehicle is at the level of the parking spot.

German published patent application DE102 20 837 A1 discloses an autonomous system which can be provided to the vehicle driver for parking space searching. A beam sensor system on the vehicle is oriented in such a way that the area in front of the vehicle is illuminated. This design makes it possible to detect a potential parking space early within the context of processing the echo signals of the beam sensor system so that sufficient time is provided to examine them for their suitability for parking in the context of signal processing and, if necessary, to decelerate the vehicle safely until such a parking space is reached.

German published patent application DE 196 00 059 A1 discloses a method for signal processing in a motor vehicle radar arrangement and a radar arrangement for this purpose. The signal processing method provides further information about the traffic situation in the observation direction by evaluating echo signals deflected at the roadway. A parking space cannot be detected therewith.

German published patent application DE 10 2008 004 633 A1 relates to a method and a device for detecting and/or measuring a parking space. Three-dimensional data of the surroundings of a vehicle are acquired in this case. Objects in the surroundings of the vehicle are classified into objects delimiting parking spaces and objects not delimiting parking spaces. A spatial region of the surroundings of the vehicle that is suitable as parking space for the vehicle is determined and the data about the spatial region suitable as a parking space is output to the driver or to a superordinate system.

German published patent application DE 10 2011 113 719 A1 discloses a method for detecting a parking space located in front of a vehicle. Parking space measurement is carried out using a radar system, wherein the extent of a parking space located in front of the vehicle in the longitudinal direction of the vehicle is determined by evaluating radar signals reflected at least once at the roadway.

European patent application EP 3 040 909 A1 shows a parking space detection system which detects the vehicle surroundings on the basis of radar sensors located in the vehicle and determines a surrounding contour from the radar echoes and identifies free parking spaces from the gaps in the determined contour.

The object of the invention is to provide a method for the predictive detection of parking spaces suitable for a vehicle, wherein the detection of a parking space should also be robust against possible false detections, which can occur at any time in the area of a parking space either permanently or sporadically due to various propagation effects.

This object is achieved by a method for detecting parking spaces suitable for a vehicle including the steps described herein.

A further object of the invention is to provide a system for predictively detecting parking spaces suitable for a vehicle, wherein the detection of a parking space should also be robust against possible false detections, which can occur at any time in the area of a parking space either permanently or sporadically due to various propagation effects.

This object is achieved by a system for detecting parking spaces suitable for a vehicle, comprising the features described herein.

SUMMARY

The method according to the invention is characterized in that a radar signal is emitted in the direction of parked vehicles from a radar device installed in the moving vehicle. Radar signals reflected by parked vehicles and surrounding elements are received with the radar device. A distribution of the received radar signals in the X coordinate direction and Y coordinate direction is generated, wherein the X coordinate direction corresponds to a direction of movement of the vehicle and the Y coordinate direction is perpendicular to the direction of movement of the vehicle. A first straight line and at least a second straight line are determined on the basis of the frequency of distribution of the received radar signals which define a parking area of the parked vehicles. A projection profile that generates the frequency of distribution of the received radar signals in the parking area in the Y coordinate direction perpendicular to the direction of movement of the vehicle along a zero line is defined. This applies to the case in which the direction of movement of the vehicle is parallel to the parking area of the parked vehicles. For this ideal case, a parking space is determined on the basis of a prediction error function along the X coordinate direction, wherein a periodicity for the vehicles parked along the parking area is calculated by means of the projection profile, and a gap in the projection profile results in the highest value in comparison to the calculated periodicity for the prediction error function, thereby indicating an available parking space.

In general, the direction of movement of the vehicle is not parallel to the vehicles parked in the parking area. Due to the frequency of distribution of the detected radar signals, the first straight line and the second straight line are inclined in relation to the X coordinate direction of the Cartesian coordinate system. For determining the histogram, the Cartesian coordinate system may be aligned, for example, along the straight line. According to another possible embodiment, the histogram may be calculated along the determined first straight line. The first straight line has components in the X coordinate direction and in the Y coordinate direction.

In the ideal case, when the direction of movement is parallel to the parking area of the parked vehicles, the gap in the calculated periodicity of the projection profile is performed with an autoregressive prediction filter. The autoregressive prediction filter can then be used to predict a sequence of periodicity in the X coordinate direction. Although the following description relates to a direction of movement of the vehicle parallel to the parking area of the parked vehicles, it should not be construed as a limitation of the invention. For example, a common coordinate transformation can thus be used to ensure that the histogram is aligned along the X coordinate direction.

The projection profile is, for example, a histogram representing the frequency of distribution of the received radar signals in the Y coordinate direction along the direction of travel, which ideally corresponds to the X coordinate direction.

As a rule, the determined first straight line and the determined second straight line are not parallel to the direction of travel. The histogram is thus determined along the determined first straight line.

The determined position of a parking space in the parking area of the parked vehicles is then signaled to at least one occupant of the vehicle by a display. The at least one occupant of the vehicle may be a driver. The determined position of a parking space thus serves as a comfort function in driver assistance and can be used for automated parking. In the event that the at least one occupant of the vehicle is not a driver, one speaks of autonomous driving. The determined position of the parking space thus serves as a key concept for automated parking during autonomous driving.

The system according to the invention for detecting parking spaces suitable for a vehicle comprises at least one radar device integrated in the vehicle. The radar device has a transmitter with a signal generator and a receiver assembly and a receiver. Also provided is a computing unit which is communicatively connected to the radar device and implemented in a central control unit of the vehicle integrated in the vehicle. An algorithm is implemented in the computing unit and determines a projection profile from the radar signals of radar echoes received with the receiver assembly from parked vehicles and surrounding elements. The projection profile is preferably a histogram. A periodicity for the vehicles parked along the parking area is calculated from the projection profile. A gap is found along an X coordinate direction in the calculated periodicity of the projection profile with the prediction error function. The prediction error function has the highest value at the location of the gap so that a parking space is found.

The method and the system according to the invention have the advantage that a predictive detection of parking spaces in automotive sensor systems on the basis of radar detections is thus possible. The described method is potentially used as a comfort function in driver assistance and as a key concept for automated parking during autonomous driving. Radar sensors primarily provide a list of detections, i.e., detected radar echoes, along with their position in a coordinate system. In order to detect a free parking position on the basis of a sequence of such data, a gap of a width and length that enable parking of a vehicle must be registered in a previously detected parking area. The detection of a parking space is robust against possible false detections, which can occur at any time in the area of a parking space either permanently or sporadically due to various propagation effects.

BRIEF DESCRIPTION OF THE DRAWINGS

The invention and its advantages are explained in more detail below with reference to the attached drawings.

The drawings illustrate only specific exemplary embodiments of the invention. However, the invention is explicitly not intended to be limited to the exemplary embodiments shown.

DETAILED DESCRIPTION

Figure 1:
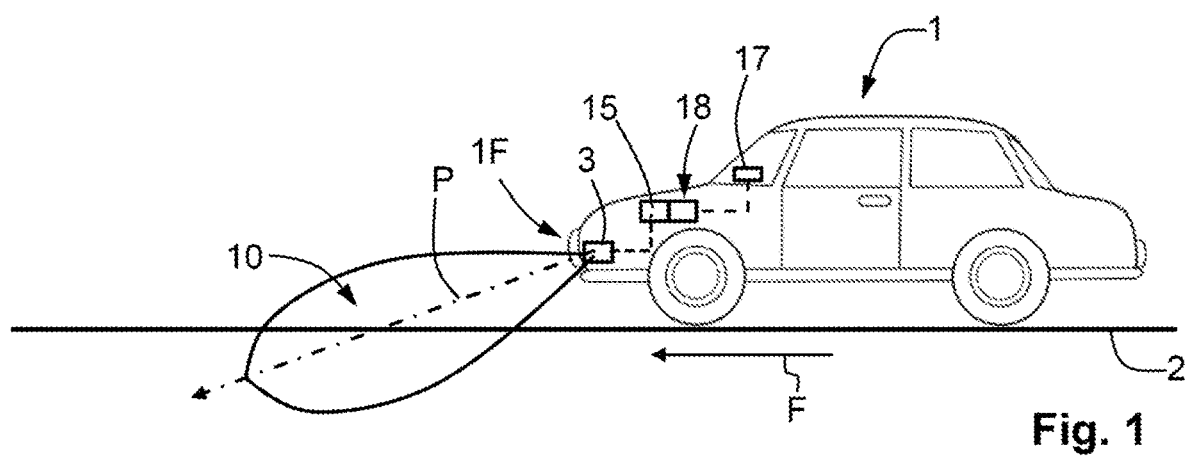
FIG. 1 shows a schematic side view of a vehicle.

FIG. 1 schematically shows a side view of a vehicle 1 or ego vehicle moving on a street 2 in a direction of movement F. The vehicle 1 comprises at least one radar device 3 which is designed to emit radar signals and to receive returning radar signals. Individual targets (here vehicles) are distinguished from the surroundings and/or resolved from the returning radar signals. It is advantageous if two radar devices 3 are provided on the left and right sides in the front area 1F of the vehicle 1. It is thus possible to use the one of the radar devices 3 that is directed to a parking area 13 of parked vehicles $30_1$, $30_2$, ... $30_M$ (see FIG. 3 or 4 in this respect).

Radar signals are emitted by the radar device 3 in a field of view 10 along an orientation P. The field of view 10 may be oriented to be more or less perpendicular to the direction of movement F of the vehicle 1. According to a preferred embodiment, the field of view 10 is arranged at an azimuth angle of about 140°. The vehicle 1 has a computing unit 15 which can be integrated in a central control unit 18 of the vehicle 1. The radar device 3 is communicatively connected at least to the computing unit 15. The radar signals 12 received by the radar device 3 (see FIG. 2) are collected, processed and evaluated in the computing unit 15 in order to find a parking space (not shown here) on the basis of the received radar signals 12. Furthermore, the central control unit 18 may be communicatively connected to a display 17 which indicates, for example, the detection of a suitable parking space. The display 17 may be designed for acoustic and/or visual information.

Figure 2:
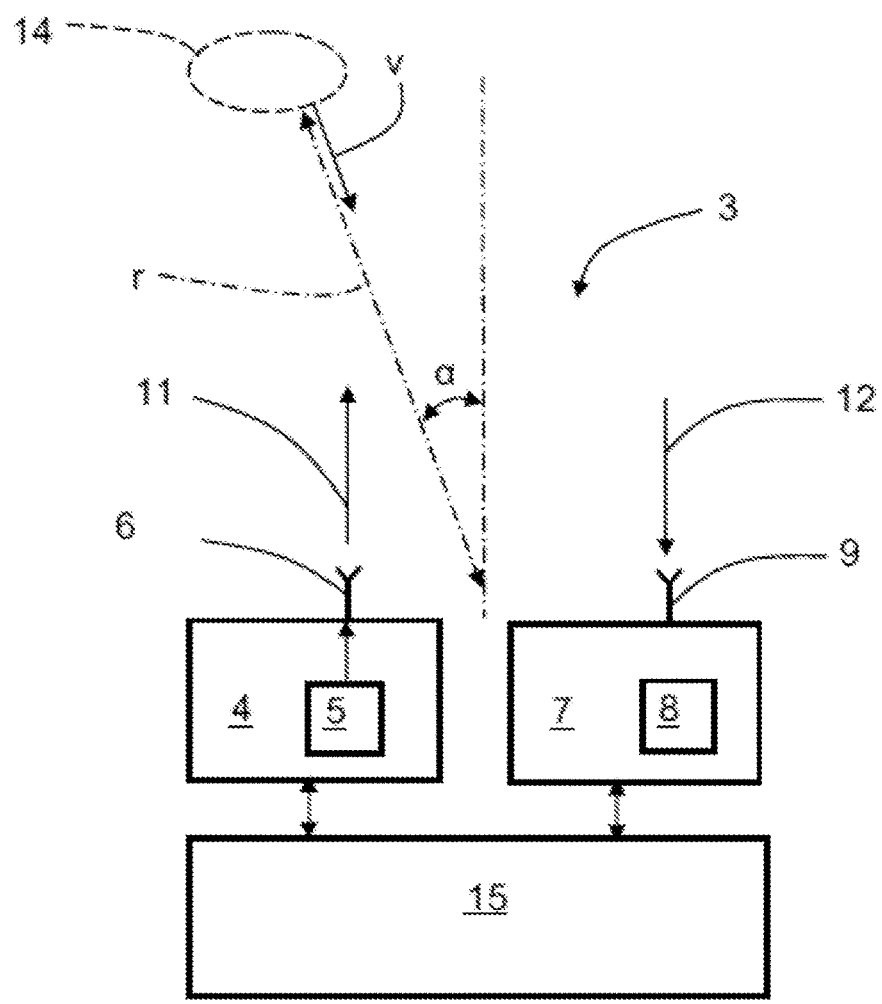
FIG. 2 shows a simplified schematic representation of the radar device used in the present invention.

With reference to FIG. 2, the radar device 3 consists of a transmitter 4 which in turn comprises a signal generator 5 and a transmitting antenna 6. The radar device 3 of the vehicle 1 furthermore consists of a receiver assembly 7 which in turn comprises a receiver 8 and a receiver antenna 9.

The radar signals 11 emitted by the radar device 3 are reflected and the received or reflected radar signals 12 are received by the receiver 8 via the receiver antenna 9. When the radar device 3 is being used, the transmitting antenna 6 emits a radar signal 11 along an orientation P (see FIG. 1) when the vehicle 1 or ego vehicle passes a parking area 13 (see FIG. 3 or 4). The radar device 3 directs a specific field of view 10 (see FIG. 1) onto the parking area 13 when the vehicle passes along the parking area 13. The radar device 3 then receives radar echoes 14 of the transmitted radar signals 11 via the receiver antenna 8.

The transmitter 4 and the receiver assembly 7 of the radar device 3 are arranged such that azimuth angles of the radar echoes 14 are provided by simultaneously receiving and analyzing the phase and amplitude of the received radar signals 12. Each radar echo 14 has a specific and detected azimuth angle α, a distance r, and a radial velocity v.

Figure 3:
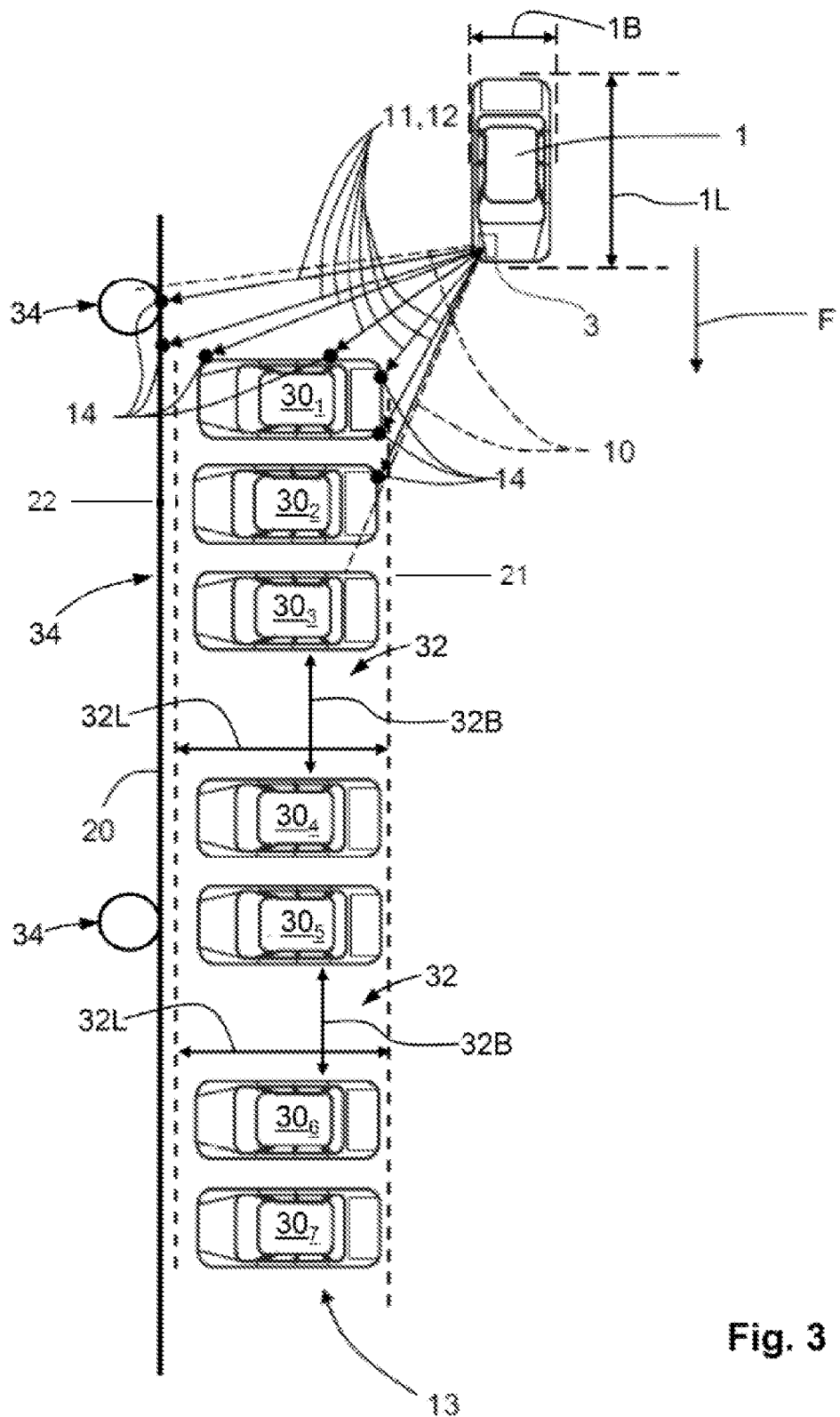
FIG. 3 shows a schematic view of a situation in which a vehicle passes a row of vehicles parked in a possible mode.

FIG. 3 shows the situation in which the vehicle 1 or ego vehicle is passing a parking area 13 with a plurality of parked vehicles $30_1$, $30_2$, ... $30_M$ along a direction of movement F. The vehicle 1 itself has a width 1B and a length 1L. In the passing vehicle 1, at least the radar device 3 of the vehicle 1 that is closest to the parked vehicles $30_1$, $30_2$, ... $30_M$ is activated. As the vehicle 1 moves in the direction of movement F, a plurality of radar echoes 14 of the transmitted radar signals 11 are collected in the form of received radar signals 12 using the radar device 3. The transmitted radar signals 11 are emitted within the field of view 10. The radar echoes 14 are generated by the parked vehicles $30_1$, $30_2$, ... $30_M$ and by surrounding elements 34. The surrounding elements 34 may, for example, be street lights, curbs, masonry, bollards, etc. In the parking mode of parked vehicles $30_1$, $30_2$, ... $30_M$ shown here, two parking spaces are formed in the parking area 13. The parked vehicles $30_1$, $30_2$, ... $30_M$ are parked here perpendicularly to the direction of movement F of the vehicle 1.

During the movement of the vehicle 1, a suitable parking space 32 is found for the vehicle, if available. A suitable parking space 32 has a width 32B and a length 32L, both of which are greater than a width 1B and a length 1L of the vehicle 1.

Figure 4:
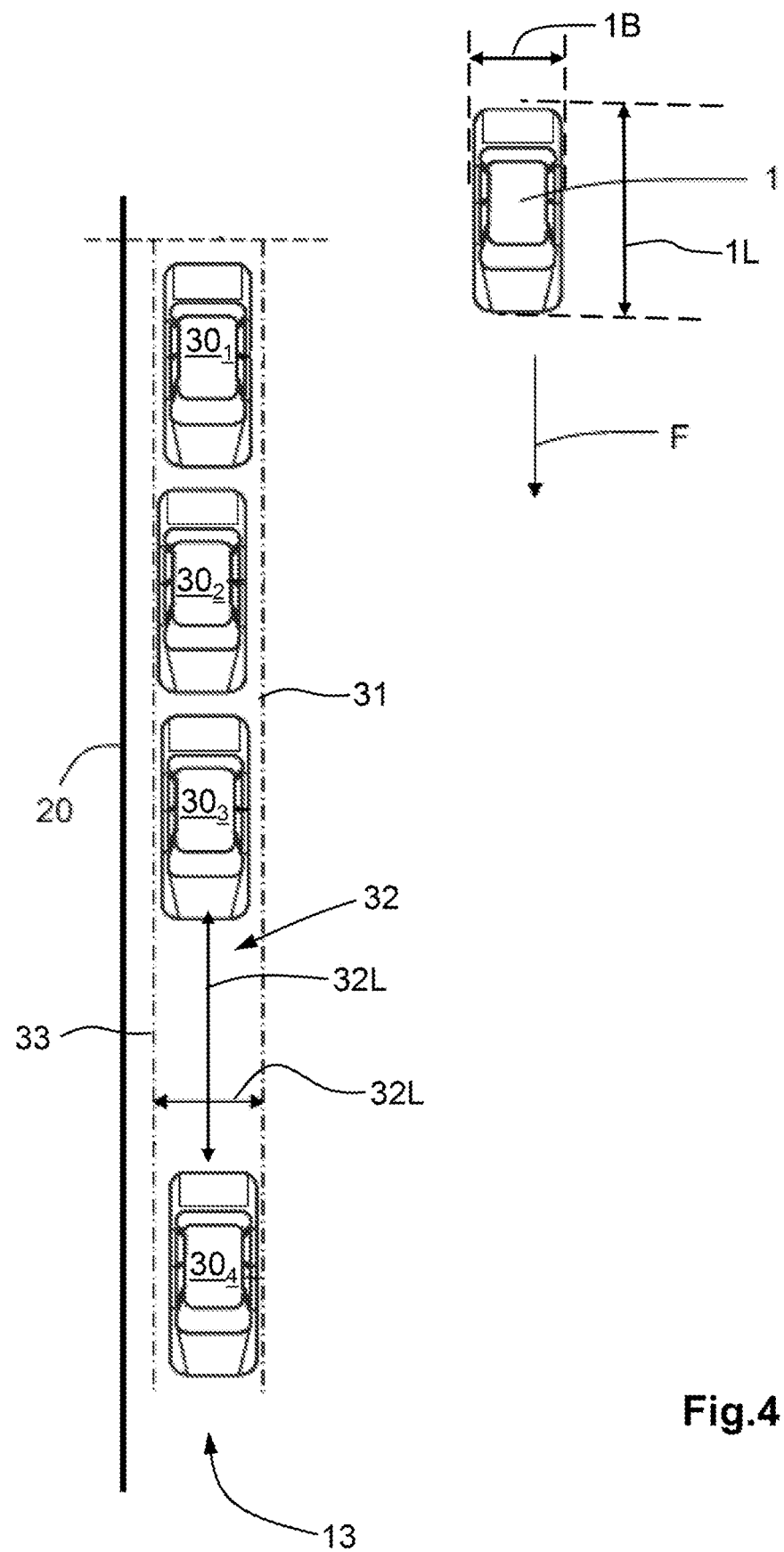
FIG. 4 shows a schematic view of a situation of vehicles parked in another mode.

FIG. 4 shows another possibility for parking the vehicles 301, 302, . . . 30M, which are parked in parallel to the direction of movement F of the vehicle 1. The parking area 13 is defined by the first boundary line 31 and by the second boundary line 33. The first boundary line 31 and the second boundary line 33 run in parallel to the direction of movement F of the vehicle 1. Here, too, the condition applies that a suitable parking space 32 is found if the suitable parking space 32 has a width 32B and a length 32L, both of which are greater than a width 1B and a length 1L of the vehicle 1.

Figure 5:
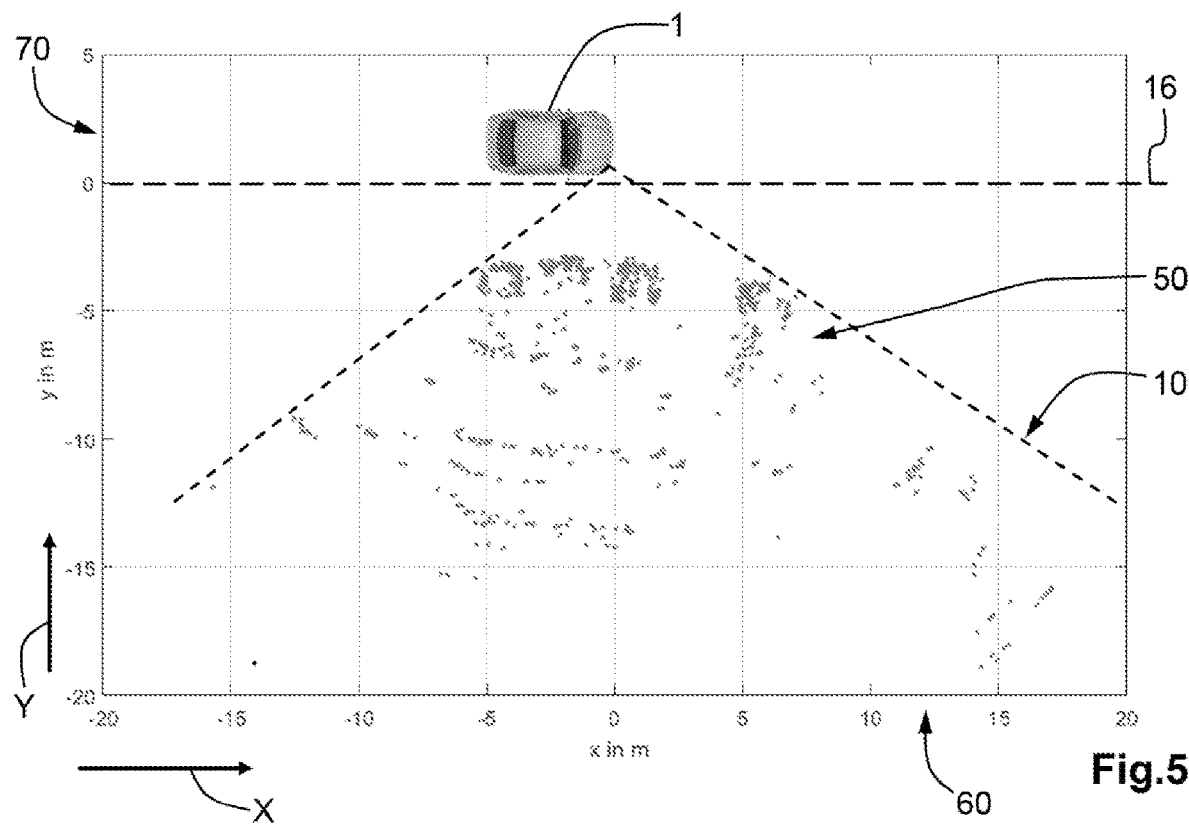
FIG. 5 shows a typical distribution of radar detections as point clouds next to the vehicle in which the receiving radar sensor is located.

FIG. 5 shows a typical representation of radar detections presented as a point cloud 50 next to the vehicle 1. The point cloud 50 is graphically represented in a two-dimensional coordinate system. The distance in meters is plotted on the abscissa 60 and the ordinate 70. The point cloud 50 represents the received radar signals 11 in the field of view 10. A zero line 16 defines a reference line from which the distances of the individual elements of the point cloud 50 are measured.

Figure 6A:
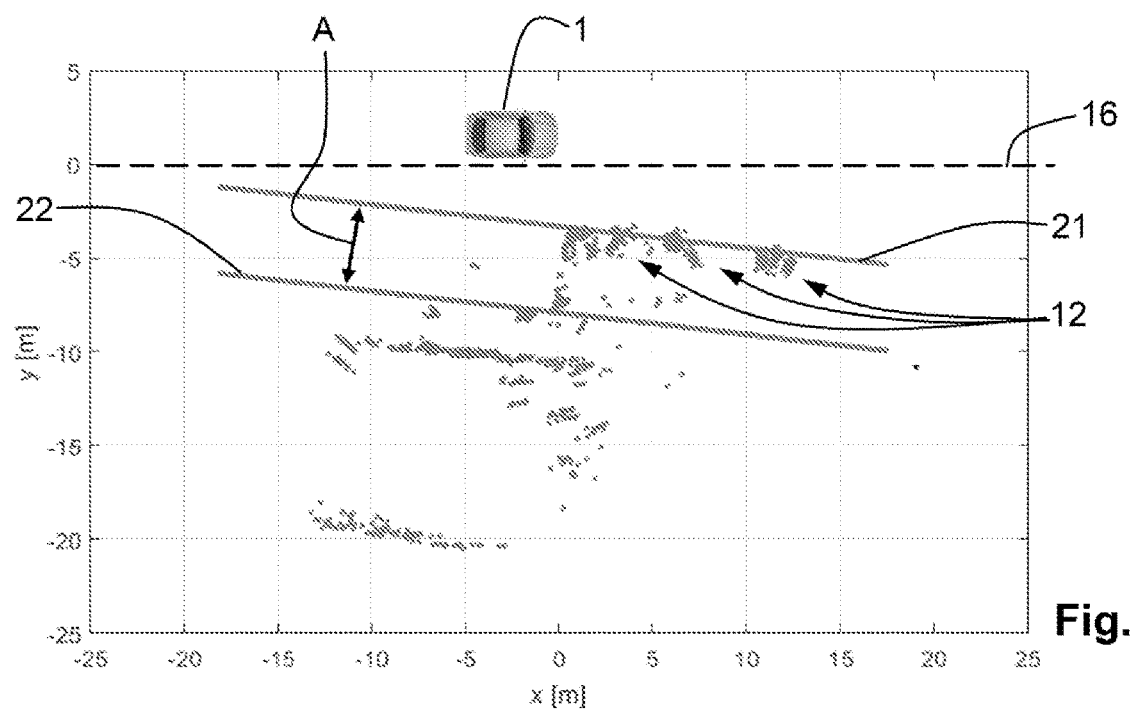
FIG. 6A shows a determination of straight lines on which radar detections are accumulated along the direction of travel of a vehicle.

As shown in FIG. 6A, prior to a parking space search performed on the basis of a prediction filter, a first straight line 21 and a second straight line 22 are determined. It is obvious to a person skilled in the art that other filters may also be used. The prediction filter is merely a preferred embodiment. Along the first straight line 21 and along the second straight line 22, the received radar signals 12 are accumulated. The first straight line 21 and the second straight line 22 indicate that similar objects (in this case, parked vehicles 301, 302, . . . 30M) are very likely to be lined up regularly next to one another. The first straight line 21 is selected to be closest to the zero line 16 or the vehicle 1. The second straight line 22 is determined on the basis of the accumulated and received radar signals 12 such that a distance A of the first straight line 21 to the second straight line 22 corresponds approximately to the parking area 13.

Figure 6B:
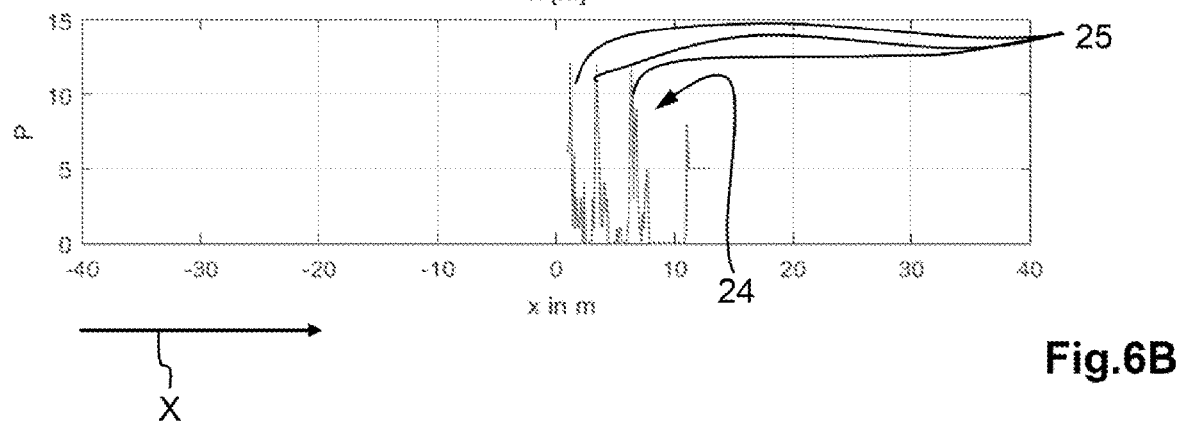
FIG. 6B shows the projection profile along the straight-line direction, which represents the frequency of radar detections in relation to a viewing direction perpendicular to the parking row.

For checking and evaluating the accumulation along this preferred direction defined by the first straight line 21 and the second straight line 22, as shown in FIG. 6B, a projection profile 24 along the preferred direction can be used. This projection profile 24 represents, for example in the form of a histogram, the frequency of received radar signals 12 in relation to a viewing direction perpendicular to the parking row 13 (substantially perpendicular to the X coordinate direction X). Narrow, sharply delimited maxima 25 in this projection profile 24 are therefore an indication of an accumulation of radar detections along the parking area 13 with relatively low scattering, as is the case with many similar objects (vehicles).

Figure 7:
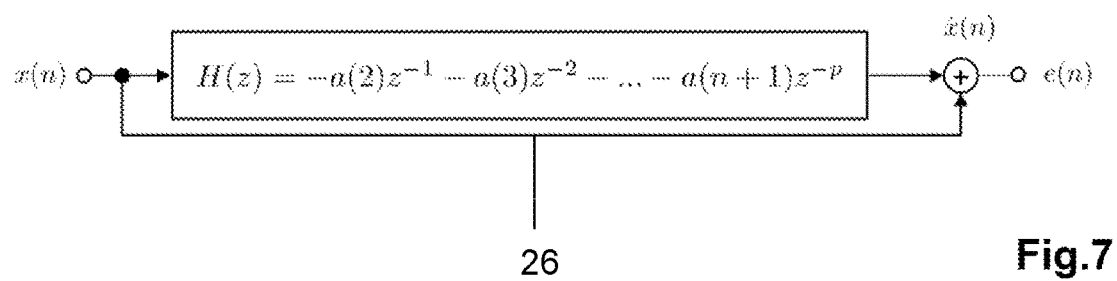
FIG. 7 shows a block diagram for determining the prediction error.

FIG. 7 shows a block diagram for determining the prediction error function 26. The detection of a gap 29 (see FIG. 8) within a parking area 13 is achieved by taking advantage of the spatial periodicity of the radar detections in the direction of the row of parked vehicles $30_1$, $30_2$, . . . $30_M$. At least one disturbance of the periodicity is searched for with a suitable algorithm. For this purpose, an autoregressive prediction filter is applied to the spatial sequence of the detected and received radar signals 12. Such a prediction filter is particularly suitable for predicting the further course of a periodic sequence. The difference between the actual sequence x(n) and the sequence predicted by the prediction filter $\hat{x}(n)$ is called prediction error e(n).

The magnitude of the prediction error e(n) is used as a criterion for the presence of a parking space 32. It is namely obvious that the prediction of a periodic sequence produces a great error in particular when the periodicity of the original sequence is interrupted. In this case, the predictor starts from an undisturbed continuation of the periodic sequence, which is not the case in the case of a parking space 32. It can thus be concluded that a gap 32 is very likely to be located in the parking area 13 at the locations of a great prediction error.

In order to determine the coefficients a(k) of the predictor filter, an autoregressive model which minimizes the deviation between x(n) and the estimated value $$\hat{x}(n) = \sum_{K=1}^{P} a_k x(n-k)$$

of the filter is used in a known manner. They result as the least-squares solution of the matrix equation $$Xa = b$$

where $$X = \begin{bmatrix} x(1) & 0 & \cdots & 0 \\ x(2) & x(1) & \ddots & \vdots \\ \vdots & x(2) & \ddots & 0 \\ x(m) & \ddots & \ddots & x(1) \\ 0 & x(m) & \ddots & x(2) \\ \vdots & \ddots & \ddots & \vdots \\ 0 & \cdots & 0 & x(m) \end{bmatrix}, a = \begin{bmatrix} 1 \\ a(2) \\ \vdots \\ a(n+1) \end{bmatrix}, b = \begin{bmatrix} 1 \\ 0 \\ \vdots \\ 0 \end{bmatrix}$$

The least-squares solution sought is obtained as a solution of $$X^H X a = X^H b$$

which can be found with the aid of the Yule-Walker equation and the Levinson-Durbin algorithm (see, for example, S. L. Marple: Digital Spectral Analysis. Englewood Cliffs: Prentice Hall, 1987, and J. G. Proakis and D. G. Manolakis: Digital Signal Processing. Principles, Algorithms, and Applications. 3rd ed. Upper Saddle River: Prentice Hall, 1996).

Figure 8:
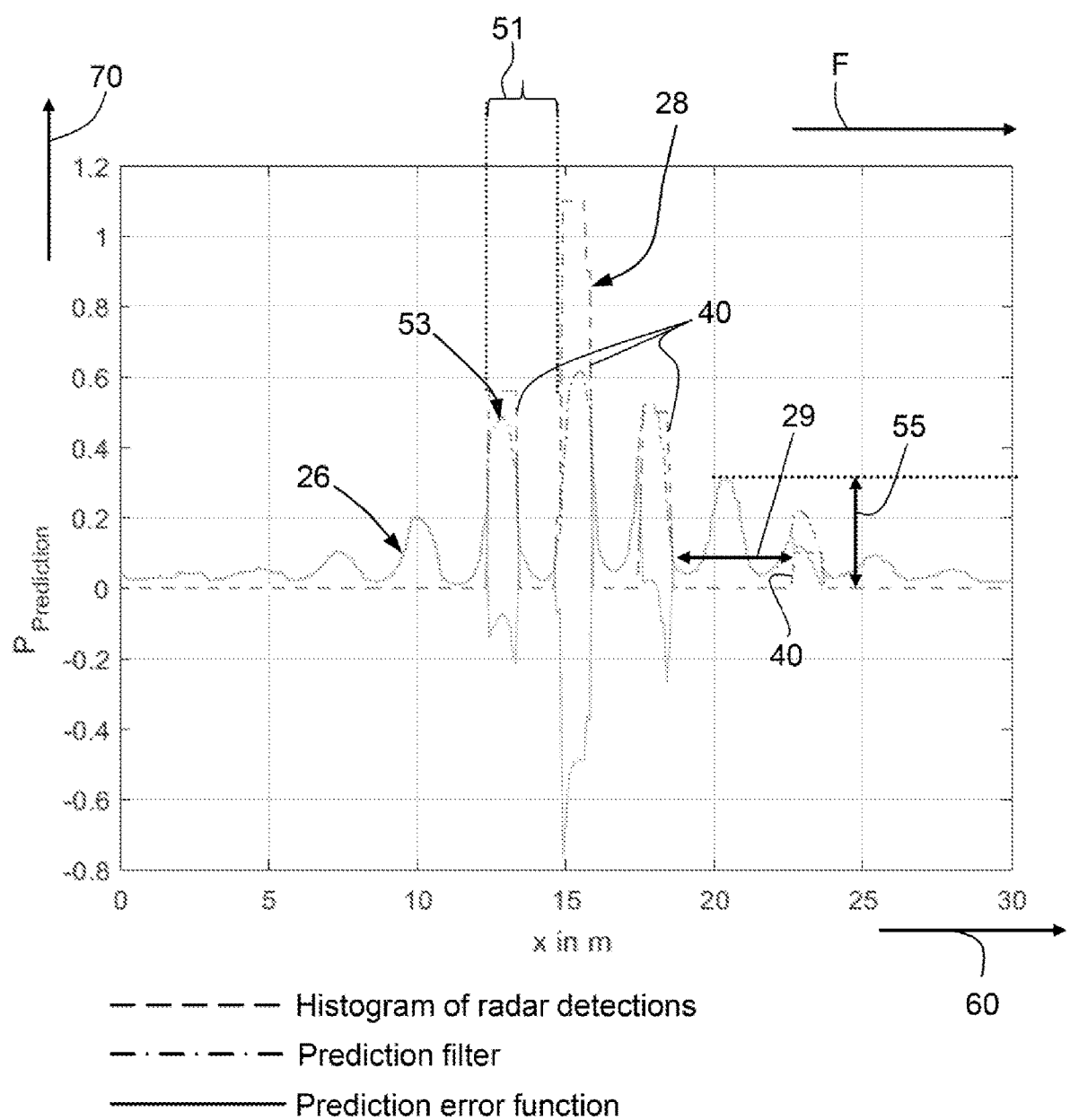
FIG. 8 shows an exemplary result of detecting an appropriate parking space in a row of parked vehicles.

FIG. 8 shows an exemplary result of the detection of an appropriate parking space 32 in a row of parked vehicles $30_1, 30_2, \ldots 30_M$. The dashed curve shows the histogram 28, i.e., the frequency of the radar detections along a previously detected parking area 13. The detections of the radar echoes 14 (see FIG. 3) occur more frequently where parked vehicles ($30_1, 30_2, \ldots 30_M$) are and, with their numerous electromagnetic scattering centers, cause many individual radar echoes 14. The histogram 28 is periodic corresponding to the approximately identical vehicle widths 1B and has gaps 29 where there are no parked vehicles $30_1, 30_2, \ldots 30_M$.

This histogram 28 is used as an input signal for an autoregressive prediction filter. As described above, this prediction filter detects the periodicity 51 contained in the histogram 28 and generates an output signal which corresponds exactly to the periodicity 51 of the histogram 28. In this way, the prediction filter provides a prediction of the course of a periodic prediction error function 26 when individual periods are missing. However, this is the case precisely when there are parking spaces 32 available in the parking area 13 of the parked vehicles $30_1, 30_2, \ldots 30_M$. Whenever a gap 29 occurs in the otherwise periodic histogram 28, the prediction error function 26, i.e., the deviation between the actual histogram 28 and the prediction made, assumes a high value. The prediction error function 26 therefore provides a significant indication of an available parking space 32. FIG. 8 also shows the output signal of the prediction filter 53 (shown by dash-dotted lines) and the prediction error function 26 (solid line) in addition to the histogram 28 (shown by dashed lines). Negative values of the prediction error function 26 occur only due to different forms of the local maxima and can be easily eliminated by preprocessing. It is essential that the prediction error function 26 otherwise assumes a high value 55 only where parking spaces 32 are located. This is not only the case within the parking row but also beyond the two ends of the parking area 13 due to the band limitation of the predictor. This prediction error function 26 thus represents a reliable criterion for a usable parking space 32 along a previously detected parking area 13 of parked vehicles $30_1, 30_2, \ldots 30_M$. In the illustration shown in FIG. 8, the distance in meters in the direction of movement F of the vehicle 1 is plotted on the abscissa 60 and the normalized value 55 of the prediction error function 26 is plotted on the ordinate 70.

It can also be seen from the illustration in FIG. 8 that the classes 40 of the histogram 28 differ in height. This is because the number of radar signals 12 received at the radar device 3 decreases the further a parked vehicle $30_1, 30_2, \ldots 30_M$ is from the vehicle 1 traveling in the direction of movement F.

The invention has been described with reference to a preferred embodiment. It is, however, obvious to a person skilled in the art that changes and variations can be made without departing from the scope of protection of the following claims.

The invention claimed is:

1. A method for detecting one or more available parking spaces suitable for an ego vehicle, comprising the following steps:

emitting a radar signal from a radar device installed in the ego vehicle;

receiving with the radar device a plurality of radar signals reflected by one or more parked vehicles;

generating a distribution of the received radar signals in the X coordinate direction and the Y coordinate direction, wherein the X coordinate direction corresponds to a direction of movement of the ego vehicle and the Y coordinate direction is perpendicular to the direction of movement of the ego vehicle;

determining a first straight line and at least a second straight line which define a parking area of the one or more parked vehicles on the basis of the frequency of distribution of the received radar signals;

forming a projection profile which represents the frequency of distribution of the received radar signals in the parking area of the one or more parked vehicles perpendicular to at least one of the first and second straight lines; and determining an available parking space of the available parking spaces on the basis of a prediction error function along the determined at least one of the first and second straight lines, wherein a periodicity for the one or more parked within the parking area is calculated by the projection profile and a gap which corresponds to the available parking space in the projection profile assumes the highest value of the prediction error function in comparison to a calculated periodicity and indicates the available parking space within the parking area.

2. The method according to claim 1 further comprising the gap which corresponds to the available parking space in the calculated periodicity of the projection profile is performed with an autoregressive prediction filter.

3. The method according to claim 2 further comprising, the autoregressive prediction filter is used to predict a sequence of periodicity in the direction of the determined at least one of the first and second straight lines.

4. The method according to claim 1 further comprising, the projection profile is a histogram which represents the frequency of distribution of the received radar signals along the determined at least one of the first and second straight lines.

5. The method according to claim 1 further comprising, the results of the determining an available parking space step is signaled to an occupant of the ego vehicle by a display.

6. The method according to claim 1 further comprising, the radar device that is closest to the parking area of the one or more parked vehicles seen from the ego vehicle is activated for detecting the available parking spaces suitable for the ego vehicle.

7. A system for detecting one or more available parking spaces suitable for an ego vehicle, comprising at least one radar device which is integrated in the ego vehicle and comprises a transmitter with a signal generator emitting a radar signal and a receiver receiving a plurality of the radar signals reflected by one or more parked vehicles, and a computing unit which is communicative with the radar device and implemented in a central control unit of the ego vehicle integrated in the ego vehicle, the computing unit generating a distribution of the received radar signals, and determining at least one straight line defining at least a part of the parking area of the one or more parked vehicles, an algorithm is implemented in the computing unit and determines a projection profile from the radar signals of radar echoes received by the receiver assembly from one or more parked vehicles, and calculates a periodicity for the one or more vehicles parked along the parking area from the projection profile, and finds a gap which corresponds to an available parking space of the one or more available parking spaces, in the calculated periodicity of a projection profile of a prediction error function along a straight line in which the prediction error function has a highest value at a location of the gap.

8. The system according to claim 7 further comprising, the projection profile is a histogram and a class of the histogram corresponds to a parked vehicle of the one or more parked vehicles.

9. The system according to claim 7 further comprising, the algorithm implemented in the computing unit comprises an autoregressive prediction filter so that the gap indicative of the available parking space can be determined in the calculated periodicity.

10. The method according to claim 1 further comprising, the step of receiving with the radar device a plurality of radar signals reflected by one or more surrounding elements.

11. The system according to claim 7 further comprising, the computing unit determining the projection profile from the radar signals received with the receiver assembly from one or more surrounding elements.

* * * * *